United States Patent [19]

Schönbohm

[11] Patent Number: 5,502,945

[45] Date of Patent: Apr. 2, 1996

[54] SYSTEM FOR COMMISSIONING PACKAGED GOODS

[75] Inventor: Hartmut Schönbohm, Witten, Germany

[73] Assignee: Kommissioner Und Handhabungstechnik GmbH, Gelsenkirchen, Germany

[21] Appl. No.: 339,351

[22] Filed: Nov. 14, 1994

[30] Foreign Application Priority Data

Nov. 11, 1993 [DE] Germany .................... 43 39 002.1

[51] Int. Cl.⁶ ..................................... B65B 1/04
[52] U.S. Cl. ......................... 53/247; 53/543; 53/244
[58] Field of Search ................ 53/244, 247, 251, 53/539, 543; 414/276, 732, 737, 738

[56] References Cited

U.S. PATENT DOCUMENTS

| | | | |
|---|---|---|---|
| 3,674,159 | 7/1972 | Lemelson | 414/276 |
| 3,710,543 | 1/1973 | Toss | 53/244 |
| 3,951,274 | 4/1976 | Yamamoto | 53/244 |
| 4,611,458 | 9/1986 | Prakken | 53/247 |
| 4,800,703 | 1/1989 | Goodman | 53/244 |
| 5,079,903 | 1/1992 | Hakansson | 53/247 |

FOREIGN PATENT DOCUMENTS

| | | | |
|---|---|---|---|
| 0360310 | 3/1990 | European Pat. Off. | 53/251 |
| 1634573 | 3/1991 | U.S.S.R. | 53/244 |

*Primary Examiner*—John Sipos
*Assistant Examiner*—Ed Tolan
*Attorney, Agent, or Firm*—Cohen, Pontani, Lieberman, Pavane

[57] ABSTRACT

A system for individually commissioning packaged goods from a supply path, in which the goods are arranged in rows, to containers with a movable or positionable transporting device. The packaged goods lie on a slanted chute against a first stopping surface and are picked up by the transporting device which is positionable against a second stopping surface and are released over a selected remote container.

10 Claims, 2 Drawing Sheets

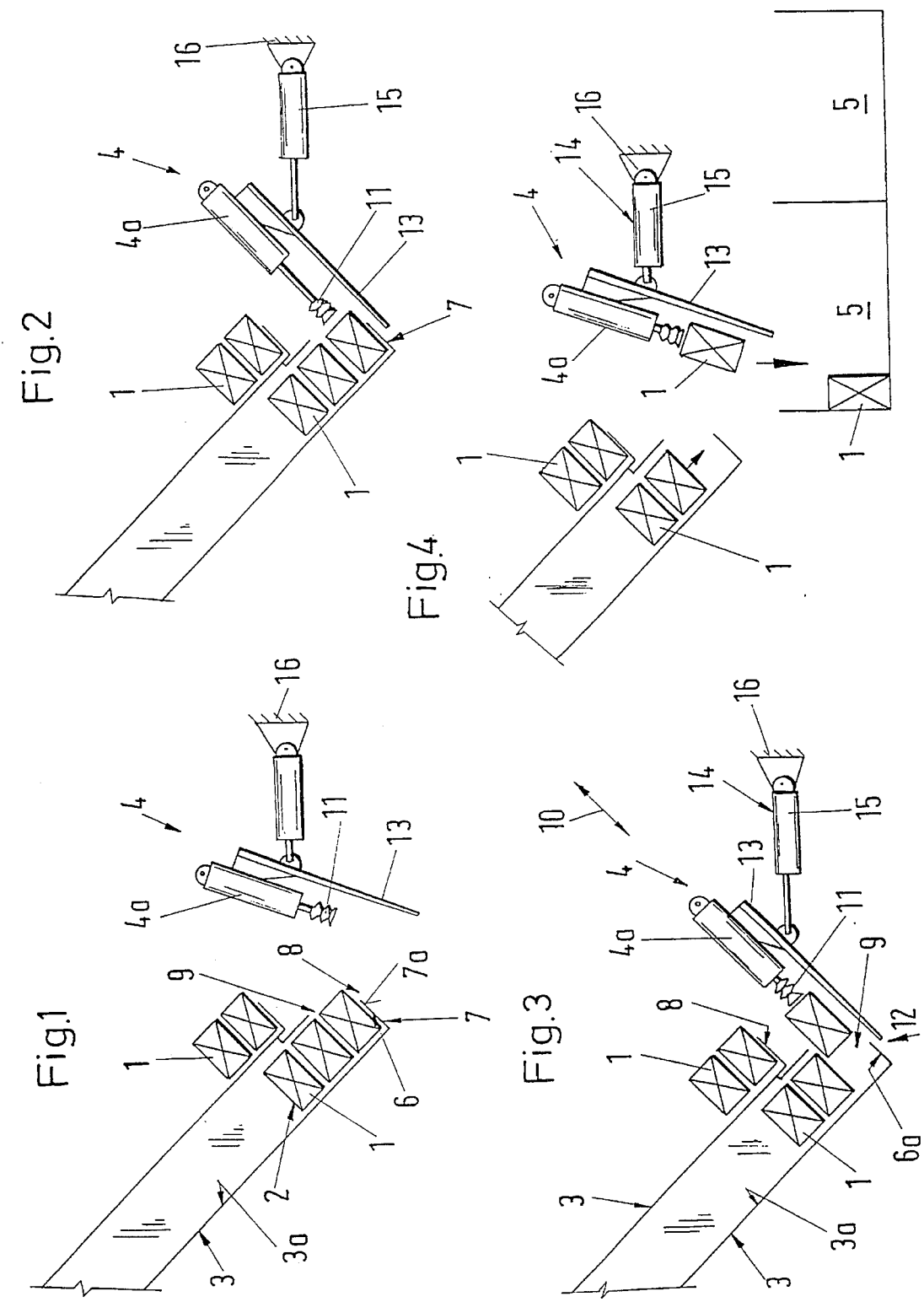

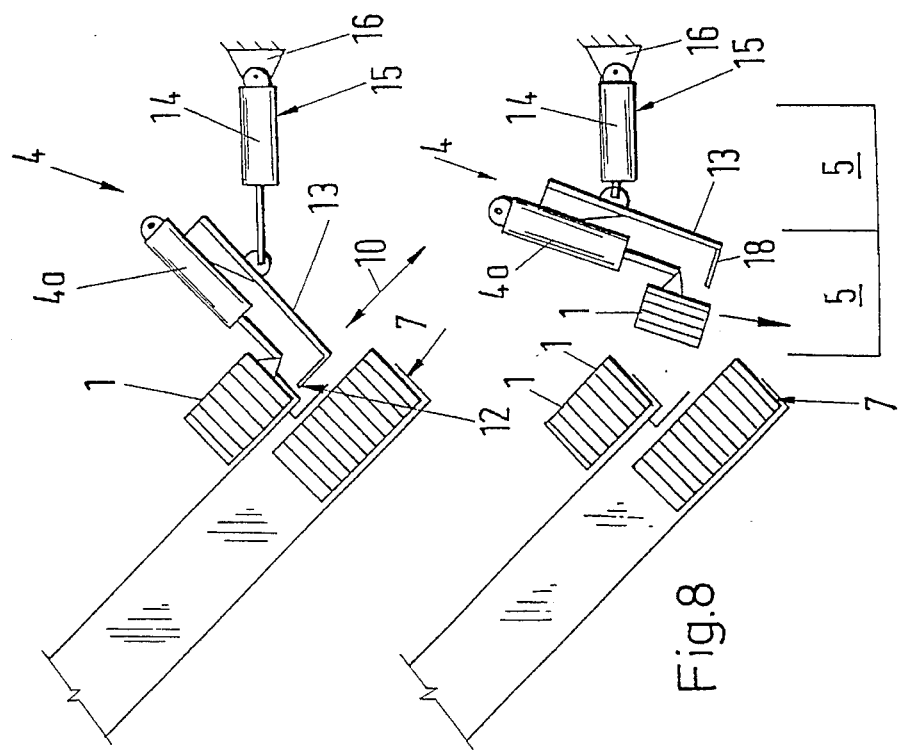
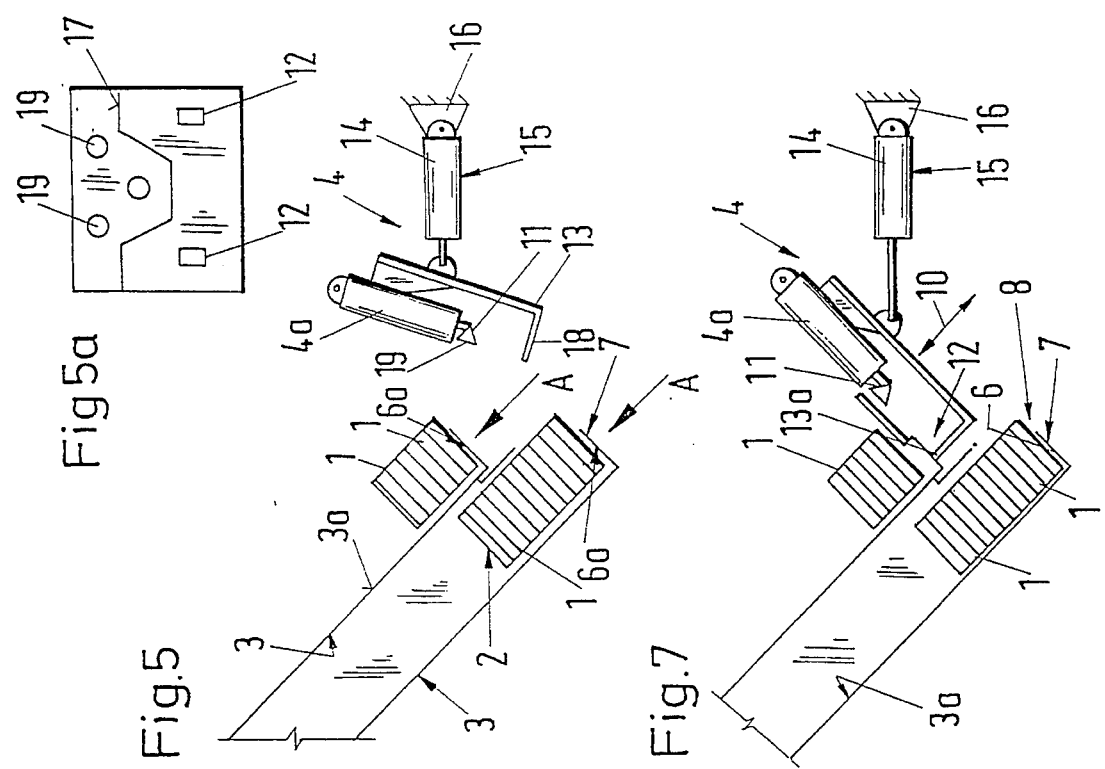

SYSTEM FOR COMMISSIONING PACKAGED GOODS

BACKGROUND OF THE INVENTION

1. Field of the Invention

The present invention relates to a system for commissioning packaged goods from a supply path where the goods are arranged in rows to containers, using a movable transporting device.

2. Description of the Prior Art

A system is known for commissioning packaged goods which stand in rows on a goods path and can be transported individually into containers by means of a movable or positionable transporting device (DE-A1-32 13 119).

As is known, the commissioning system consists of a transport container that pass by, and automatic stacking, storing and removing of multiple types of packaged goods from volume storage is carried out in a computer-controlled fashion by the row from multiple shelves with sorting magazines and the goods are loaded into the transport containers that are passing by. In connection with this, methods are also known for maximizing the speed of the transport containers in keeping with the total minimized removal, collection and filling times so that removal takes place in a minimum amount of time.

However, this known process and the known system are only suitable when the packaged goods enter the moving transport containers by means of ejection. A more exact control of the transporting device relative to the removal station is not possible.

SUMMARY OF THE INVENTION

Accordingly, it is an object of the present invention to provide a system for reliably collecting the packaged goods individually from a sorted supply or goods path, taking control of them, and then transporting them further.

This object is attained according to the invention by a system in which the packaged goods lie against a first stopping surface on a slanted chute and can be picked up by a transporting device, which is positionable against a second stopping surface, and can be released over selected remote containers. A system of this sort is especially suitable for boxes, cans, bottles and the like, and these relatively small packaged goods can therefore be removed accurately and reliably from the goods path.

In an advantageous embodiment of the invention the first stopping surface is an inner surface of the end limit of the chute and the second stopping surface is the outer surface of the end limit of the chute. When working with a movable or positionable transporting device of this type, the speedy and low-cost commissioning of packaged good items, such as boxes., cans, bottles and the like, is economically possible on the basis of small-scale or middle-scale piece removal numbers and frequencies.

According to another embodiment, the chute is largely closed on all sides and has a passageway opening in the area of the first stopping surface, which is adjustable to the size of the packaged goods and lies opposite to the direction of action of the transporting device. This permits the removal of items by the transporting device at a predetermined location, e.g., a shaft, in various directions.

Also contributing to the accurate, fast and reliable positioning of the transporting device is the fact that a feeler is provided on the transporting device so as to run parallel to the direction of action of a gripper. The feeler extends, in a touch position, up to the second stopping surface. Such a system can advantageously be used for multiple goods paths arranged one above the other, with the same desired shelf and positioning accuracy.

According to additional embodiment of the invention, a pneumatic or hydraulic semirotary actuator is connected to the feeler. The actuator has a cylinder that is connected in hinged fashion to a movable or positionable frame. This semirotary actuator permits the transporting device or the feeler to be positioned by a swinging movement.

In another embodiment of the invention, the end limit of the chute is provided with at least one recess through which the gripper may be passed. In this case, the transporting device or the feeler is directly positioned on the packaged goods, so that the positioning accuracy for the transporting device is especially high. Embodying this idea, the feeler is equipped on its tip with an angular piece. Advantageously, the gripper is a suction device.

The invention is not limited by the embodiments described above which are presented as examples only but can be modified in various ways within the scope of protection defined by the appended patent claims.

BRIEF DESCRIPTION OF THE DRAWINGS

FIG. 1 is a side view of two goods paths arranged one above the other, with a transporting device in a waiting position;

FIG. 2 is a side view as in FIG. 1, with the transporting device already positioned for operation;

FIG. 3 is a side view as in FIG. 1, showing the removal sequence of the transporting device;

FIG. 4 is a side view, with goods paths arranged one above the other and multiple containers;

FIG. 5 is a side view corresponding to FIG. 1, with an alternative design of the transporting device and the first and second stopping surfaces;

FIG. 5a is a view in Direction A of FIG. 5;

FIG. 6 is a side view as in FIG. 2 with the transporting device operating in a touch position;

FIG. 7 illustrates the beginning of the pick-up of packaged goods by the transporting device; and FIG. 8 is a side view as in FIG. 4 with the transporting device and the stock containers, whereby the packaged goods are placed in one of the stock containers.

DETAILED DESCRIPTION OF THE PREFERRED EMBODIMENTS

The system for the commissioning of packaged goods 1, which stand in rows 2 on a goods path 3, has a movable or positionable transporting device 4, which transports the packaged goods 1 into containers 5.

The goods path 3 is formed by a slanted chute 3a, which is equipped at each end with a respective end limit member 8. These end limit members 8 constitute, respectively, an inner surface 6a which forms a first stopping surface 6 and an outer surface 7a which forms a second stopping surface 7. The packaged goods 1 lying on the slanted chute 3a against the first stopping surface 6 can be picked up by means of the transporting device 4, which is positioned against the second stopping surface 7, and can be subsequently released over selected remote containers 5 (FIG. 4).

The packaged goods 1 to be commissioned lie in a goods path 3 which is designed in a shaft-like fashion and runs at an angle to horizontal so that the packaged goods slip down of their own accord to the lower end of the slanted chute 3a. The commissioning stockpile is in the rest position, possibly at a great distance from the containers 5, so that no danger of collision exists. In this position, the transporting device 4 is placed in front of the appropriate slanted chute 3a by vertical and/or horizontal movement. As soon as the correct position is achieved (FIG. 2), the transporting device 4 moves into a working position.

The chute 3a, due to its shaft form, is largely closed on all sides and has a passageway opening 9 only in the vicinity of the first stopping surface 6. The opening 9 can be adjusted to the packaged goods 1 and lies opposite to the direction of action 10 of the transporting device 4. The end limit of movement of the transporting device 4 in the direction towards the working position is provided by a feeler 13, which rests, to a certain extent, on the commissioning shaft itself. The feeler is provided on the transporting device 4 and runs parallel to the direction of action 10 of a gripper 11. The feeler 13 extends in a touch position 12 up to the second stopping surface 7. In this way, all measurement errors of the chute 3a or the goods path 3 are compensated for to the greatest possible extent. In this position, the gripper 11 is already in the correct position to take control of the packaged goods 1. This position may also be achieved, among other ways, through the fact that attached to the feeler 13 there is a pneumatic or hydraulic semirotary actuator 14 that has a cylinder 15 which is connected in a hinged manner to a movable or positionable frame 16 for the transporting device 4.

For the purpose of removal, a drive 4a of the transporting device 4, which consists of a cylinder with a vacuum suction device 19, moves to the packaged goods 1. The goods are suctioned in by the suction device 19, and the drive 4a moves back into its rest position (FIG. 3). In this way, the packaged goods 1 to be commissioned are lifted up out of the chute 3a. Finally, the transportation device 4 moves back into its original position (FIG. 1). At this point, the article remains suctioned in via the vacuum (FIG. 4). To end the cycle, the vacuum suction device 19 is shut off and the commissioned packaged goods 1 drop into one of the containers 5. Either the commissioning cycle can be repeated immediately and very quickly on the same chute 3a, or a travelling movement can be initiated which brings the transportation device 4 to a new commissioning position.

An alternative embodiment is depicted in FIGS. 5 to 8. Here, the end limit member 8 has at least one recess 17 and the gripper 11 can be passed through this recess 17. The feeler 13 is equipped at its tip 13a with an angular piece 18. In addition, the gripper 11 is designed as a suction device 19. FIGS. 5 and 5a show how an otherwise identical transporting device 4 for very flat packaged goods 1, such as compact disks, for example, works. The basic movement of touching the second stopping surface is different in that, as shown in FIG. 5a, the touch position 12 remains on the outer surface 7a, whereas the suction device 19, however, passes through the recess 17. The basic movement of this embodiment of the commissioning system, i.e., touching, removing the packaged goods 1, swinging back into the original position, and depositing the packaged goods 1, is essentially the same as described previously. However, there is the difference that the suction device 19 does not work on the upper surface of the packaged goods 1, but rather on their side surface, as is advantageous in the case of very thin goods such as compact disks.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

I claim:

1. A system for commissioning goods arranged in rows from a supply path to a container, comprising: a slanted chute having a first stopping surface and a second stopping surface at one end of the chute, the chute being adapted so that when goods are arranged on the chute a first respective article from the row of goods is in contact with the first stopping surface of the chute; and transporting means including a feeler and lifting means operatively connected to the feeler, means for moving the transporting means into a pick-up position in which the feeler is against the second stopping surface, for picking up the article of goods resting against the first stopping surface from the chute and releasing the article over the container in a release position, said chute having an end limit member at said one end with an inner surface which forms the first stopping surface and an outer surface which forms the second stopping surface.

2. A system as defined in claim 1, wherein the pick-up means includes means for gripping the article of goods and a semi-rotary actuator for swinging the gripping means between the release position and the pick-up position, and further comprising a drive for moving the gripping means towards the article of goods, the semi-rotary actuator being operatively connected to the feeler and to the drive, and the gripping means being arranged to have a direction of action that is substantially vertical to the conveying direction of the slanted chute.

3. A system as defined in claim 2, wherein the chute is closed on all sides and defines, in an area of the first stopping surface, an opening that accommodates the packaged goods and lies opposite to a direction of action of the gripping means arranged in the pick-up position.

4. A system as defined in claim 2, wherein the feeler is arranged on the semi-rotary actuator and adapted to run parallel to a direction of action of the gripping means.

5. A system as defined in claim 2, wherein the semi-rotary actuator includes a cylinder hinged to the transporting means.

6. A system as defined in claim 4, wherein the end limit member has at least one recess arranged so that the gripping means can pass through the recess.

7. A system as defined in claim 1, and further comprising an angular member at a tip of the feeler.

8. A system as defined in claim 2, wherein the gripping means includes a suction device.

9. A system as defined in claim 1, and further comprising means for positioning the transporting means, said positioning means including a vertically movable frame member and a piston/cylinder connected between the movable frame and the transporting means.

10. A system as defined in claim 1, wherein the chute has an end limit member with an inner surface which forms the first stopping surface and an outer surface which forms the second stopping surface.

\* \* \* \* \*